(12) United States Patent
Fujiwara et al.

(10) Patent No.: US 12,681,337 B2
(45) Date of Patent: Jul. 14, 2026

(54) CALIBRATION METHOD FOR PHASE MODULATOR, CALIBRATION METHOD FOR BALANCED PHOTODETECTOR, AND CALIBRATION SYSTEM FOR PHASE MODULATOR

(71) Applicants: National Institute of Information and Communications Technology, Tokyo (JP); National University Corporation Hokkaido University, Hokkaido (JP)

(72) Inventors: Mikio Fujiwara, Tokyo (JP); Masahiro Takeoka, Tokyo (JP); Masahide Sasaki, Tokyo (JP); Akihisa Tomita, Hokkaido (JP)

(73) Assignees: National Institute of Information and Communicatons Technology, Tokyo (JP); National University Corporation Hokkaido University, Hokkaido (JP)

( * ) Notice: Subject to any disclaimer, the term of this patent is extended or adjusted under 35 U.S.C. 154(b) by 313 days.

(21) Appl. No.: 18/579,627

(22) PCT Filed: Jul. 19, 2022

(86) PCT No.: PCT/JP2022/028111
§ 371 (c)(1),
(2) Date: Jan. 16, 2024

(87) PCT Pub. No.: WO2023/002997
PCT Pub. Date: Jan. 26, 2023

(65) Prior Publication Data
US 2024/0337868 A1     Oct. 10, 2024

(30) Foreign Application Priority Data
Jul. 19, 2021   (JP) ................................. 2021-118909

(51) Int. Cl.
*G02F 1/01* (2006.01)
*G02F 1/21* (2006.01)

(52) U.S. Cl.
CPC ........... *G02F 1/0123* (2013.01); *G02F 1/212* (2021.01); *G02F 2203/50* (2013.01)

(58) Field of Classification Search
CPC .... G02F 1/0123; G02F 1/212; G02F 2203/50; G02F 1/0147; G02F 1/21; H04B 10/5051; H04B 10/50577; H04B 10/70
See application file for complete search history.

(56) References Cited

U.S. PATENT DOCUMENTS

| | | | | | |
|---|---|---|---|---|---|
| 6,100,944 | A | * | 8/2000 | Sharp | ........................ G02F 1/21 349/1 |
| 7,324,207 | B1 | * | 1/2008 | Kirkpatrick | ............... G01J 9/02 385/12 |

(Continued)

FOREIGN PATENT DOCUMENTS

| | | |
|---|---|---|
| CN | 109889274 A | 11/2021 |
| CN | 111510290 B | 4/2022 |

(Continued)

OTHER PUBLICATIONS

International Search Report and Written Opinion pertaining to PCT/JP2022/028111, mailed Oct. 4, 2022.

(Continued)

*Primary Examiner* — Aravind K Moorthy
(74) *Attorney, Agent, or Firm* — GRUMBLES LAW PLLC; Brittany Haanan

(57)         ABSTRACT

A phase modulator calibration method includes steps of: providing a first delay interferometer to be used as a phase calibration reference and a second delay interferometer in which a phase modulator to be calibrated is installed in an optical path; for each of the first and second delay interferometers, measuring a delay time based on a time interval (Continued)

between pulses split from one input pulse and synchronizing the delay time with a cycle of a transmission clock; for the first delay interferometer, adjusting a phase difference so that input continuous-wave laser light produces an intensity-enhancing interference at an output; and determining the control signal with a calibration circuitry formed by connecting the first delay interferometer as a front stage and the second delay interferometer as a rear stage in a cascaded manner.

6 Claims, 7 Drawing Sheets

(56)                References Cited

U.S. PATENT DOCUMENTS

| | | | | |
|---|---|---|---|---|
| 8,994,421 | B1 * | 3/2015 | Lee | H03L 7/10 |
| | | | | 327/158 |
| 9,222,810 | B1 * | 12/2015 | Okandan | G01B 9/0207 |
| 9,306,664 | B1 * | 4/2016 | Vusirikala | H04B 10/07953 |
| 9,325,419 | B1 * | 4/2016 | Kato | H04B 10/506 |
| 10,056,733 | B1 * | 8/2018 | Taylor | H01S 5/0687 |
| 10,078,048 | B2 * | 9/2018 | Daly | G01N 21/274 |
| 10,483,988 | B1 * | 11/2019 | Kim | G11C 29/023 |
| 10,637,208 | B1 * | 4/2020 | Nagarajan | H01S 5/0656 |
| 10,715,256 | B1 * | 7/2020 | Chen | H04B 10/676 |
| 10,724,922 | B1 * | 7/2020 | Yao | G02B 6/024 |
| 11,251,874 | B1 * | 2/2022 | Parker | H04B 10/66 |
| 11,294,040 | B1 * | 4/2022 | Tsai | G01S 7/4865 |
| 11,313,682 | B1 * | 4/2022 | Hung | G01C 19/725 |
| 2001/0019442 | A1 * | 9/2001 | Shikata | H04B 10/5051 |
| | | | | 398/201 |
| 2001/0053008 | A1 * | 12/2001 | Ueno | H04B 10/508 |
| | | | | 398/155 |
| 2003/0002121 | A1 * | 1/2003 | Miyamoto | H04B 10/5162 |
| | | | | 398/185 |
| 2003/0058504 | A1 * | 3/2003 | Cho | H04B 10/2543 |
| | | | | 398/147 |
| 2003/0128923 | A1 * | 7/2003 | Takiguchi | H04B 10/508 |
| | | | | 385/27 |
| 2003/0169473 | A1 * | 9/2003 | Cotter | H04B 10/299 |
| | | | | 359/326 |
| 2004/0018017 | A1 * | 1/2004 | Hatayama | G02B 6/12007 |
| | | | | 398/43 |
| 2004/0047633 | A1 * | 3/2004 | Hoshida | H04B 10/505 |
| | | | | 398/201 |
| 2004/0173731 | A1 * | 9/2004 | Beger | H04B 10/66 |
| | | | | 250/226 |
| 2004/0190906 | A1 * | 9/2004 | Jain | H04B 10/2519 |
| | | | | 398/147 |
| 2004/0213579 | A1 * | 10/2004 | Chew | H04B 10/673 |
| | | | | 398/183 |
| 2005/0036725 | A1 * | 2/2005 | Leuthold | H04B 10/5053 |
| | | | | 385/3 |
| 2005/0041981 | A1 * | 2/2005 | Gill | H04B 10/548 |
| | | | | 398/183 |
| 2005/0175042 | A1 * | 8/2005 | Hajima | H01S 3/0903 |
| | | | | 372/2 |
| 2006/0044566 | A1 * | 3/2006 | Li | G01B 9/0209 |
| | | | | 356/479 |
| 2007/0047964 | A1 * | 3/2007 | Ooi | H04B 10/66 |
| | | | | 398/147 |
| 2007/0065157 | A1 * | 3/2007 | Katagiri | H04B 10/66 |
| | | | | 398/155 |
| 2007/0146026 | A1 * | 6/2007 | Lee | H03L 7/0814 |
| | | | | 327/158 |
| 2007/0197874 | A1 * | 8/2007 | Ishihara | A61B 1/043 |
| | | | | 600/117 |
| 2007/0297804 | A1 * | 12/2007 | Honda | H04B 10/25133 |
| | | | | 398/147 |
| 2008/0069571 | A1 * | 3/2008 | Honda | H04B 10/677 |
| | | | | 398/147 |
| 2008/0187323 | A1 * | 8/2008 | Honda | H04B 10/25133 |
| | | | | 398/208 |
| 2008/0240721 | A1 * | 10/2008 | Ota | H04B 10/677 |
| | | | | 398/115 |
| 2008/0240736 | A1 * | 10/2008 | Ji | H04B 10/677 |
| | | | | 398/202 |
| 2009/0041473 | A1 * | 2/2009 | Nishihara | H04B 10/5051 |
| | | | | 398/188 |
| 2009/0052905 | A1 * | 2/2009 | Tomaru | H04B 10/5162 |
| | | | | 398/163 |
| 2009/0059351 | A1 * | 3/2009 | Xu | H04L 27/223 |
| | | | | 359/325 |
| 2009/0116849 | A1 * | 5/2009 | Mizuguchi | H04B 10/5561 |
| | | | | 375/308 |
| 2009/0116851 | A1 * | 5/2009 | Heffner | H04B 10/677 |
| | | | | 398/208 |
| 2009/0161113 | A1 * | 6/2009 | Chen | G02B 6/12007 |
| | | | | 356/477 |
| 2009/0174885 | A1 * | 7/2009 | Li | G01B 9/02051 |
| | | | | 356/450 |
| 2009/0226184 | A1 * | 9/2009 | Nishihara | H04B 10/5053 |
| | | | | 398/188 |
| 2009/0303491 | A1 * | 12/2009 | Asano | H04L 27/223 |
| | | | | 356/477 |
| 2010/0085992 | A1 * | 4/2010 | Rakuljic | G01S 7/4911 |
| | | | | 372/20 |
| 2010/0238455 | A1 * | 9/2010 | de Groot | G01B 9/02004 |
| | | | | 356/512 |
| 2010/0272432 | A1 * | 10/2010 | Johnson | G01B 9/02091 |
| | | | | 398/17 |
| 2010/0310260 | A1 * | 12/2010 | Mandai | H04B 10/677 |
| | | | | 398/202 |
| 2011/0076011 | A1 * | 3/2011 | Kagawa | H04B 10/07953 |
| | | | | 398/16 |
| 2011/0150226 | A1 | 6/2011 | Cho | |
| 2011/0172974 | A1 * | 7/2011 | Ku | H01L 21/76898 |
| | | | | 703/2 |
| 2011/0176144 | A1 * | 7/2011 | Chen | G02F 1/11 |
| | | | | 356/521 |
| 2011/0188850 | A1 * | 8/2011 | Mikami | G02F 2/00 |
| | | | | 359/290 |
| 2011/0255095 | A1 * | 10/2011 | Jiang | G01B 9/02069 |
| | | | | 356/479 |
| 2011/0311222 | A1 * | 12/2011 | Nakamura | H04B 10/07953 |
| | | | | 398/26 |
| 2012/0020676 | A1 * | 1/2012 | Chung | H04B 10/677 |
| | | | | 398/202 |
| 2012/0044565 | A1 * | 2/2012 | Wang | G02B 27/283 |
| | | | | 349/193 |
| 2012/0154001 | A1 * | 6/2012 | Seo | H03L 7/0814 |
| | | | | 327/158 |
| 2012/0155584 | A1 * | 6/2012 | Wilkinson | G04G 7/00 |
| | | | | 375/354 |
| 2012/0163751 | A1 * | 6/2012 | Cho | G02B 6/126 |
| | | | | 385/11 |
| 2012/0213521 | A1 * | 8/2012 | Zhang | H04J 14/02 |
| | | | | 398/79 |
| 2012/0251102 | A1 * | 10/2012 | Terayama | H04B 10/6932 |
| | | | | 398/25 |
| 2013/0266313 | A1 * | 10/2013 | Shen | H04B 10/0775 |
| | | | | 398/34 |
| 2014/0016948 | A1 * | 1/2014 | Iemura | G02B 6/4214 |
| | | | | 398/212 |
| 2014/0124758 | A1 * | 5/2014 | Yoo | H10K 71/421 |
| | | | | 438/33 |
| 2014/0185125 | A1 * | 7/2014 | Kanter | H03M 1/124 |
| | | | | 359/279 |
| 2014/0293393 | A1 * | 10/2014 | Fondeur | H04B 10/25891 |
| | | | | 359/240 |
| 2014/0299743 | A1 * | 10/2014 | Miller | G02B 27/145 |
| | | | | 359/629 |
| 2014/0369678 | A1 * | 12/2014 | Yang | H04B 10/07953 |
| | | | | 398/26 |
| 2015/0077821 | A1 * | 3/2015 | Smith | G02F 1/3136 |
| | | | | 359/107 |

(56)  References Cited

U.S. PATENT DOCUMENTS

| | | | | |
|---|---|---|---|---|
| 2015/0176968 A1* | 6/2015 | Alfano | G01N 21/4788 | 356/451 |
| 2015/0200724 A1* | 7/2015 | Yang | H04B 10/07953 | 398/26 |
| 2015/0226609 A1* | 8/2015 | Cho | G01J 3/4535 | 356/477 |
| 2015/0331672 A1* | 11/2015 | Yuan | H04L 9/0852 | 359/107 |
| 2015/0372755 A1* | 12/2015 | Chung | G02F 1/21 | 398/208 |
| 2016/0047643 A1* | 2/2016 | Yuan | H01S 5/4006 | 398/25 |
| 2016/0094017 A1* | 3/2016 | Larson | H01S 5/06256 | 359/344 |
| 2016/0131842 A1* | 5/2016 | Mahgerefteh | G02B 6/124 | 385/11 |
| 2016/0164615 A1* | 6/2016 | Dailey | H04B 10/70 | 398/149 |
| 2017/0237505 A1* | 8/2017 | Lucamarini | H04L 9/0858 | 398/185 |
| 2017/0241763 A1* | 8/2017 | Wang | G01B 9/02078 | |
| 2017/0276470 A1* | 9/2017 | Mori | G01B 9/02083 | |
| 2017/0285267 A1* | 10/2017 | Kato | G02B 6/274 | |
| 2017/0324482 A1* | 11/2017 | Kato | H04B 10/677 | |
| 2017/0357054 A1* | 12/2017 | Sugiyama | G02B 6/29398 | |
| 2018/0038781 A1* | 2/2018 | Matsuda | G01N 15/0205 | |
| 2018/0302698 A1* | 10/2018 | Kanter | H04B 10/70 | |
| 2019/0013878 A1* | 1/2019 | Paraiso | H04L 9/0852 | |
| 2019/0072833 A1* | 3/2019 | Nejadriahi | G02F 1/225 | |
| 2019/0335994 A1* | 11/2019 | Yun | G01J 3/0229 | |
| 2019/0391006 A1* | 12/2019 | Pelletier | G01J 1/44 | |
| 2020/0081319 A1* | 3/2020 | Totsuka | G02F 1/3534 | |
| 2020/0091673 A1* | 3/2020 | Kim | H01S 3/137 | |
| 2020/0150240 A1* | 5/2020 | Huwer | G01S 7/4865 | |
| 2020/0272018 A1* | 8/2020 | Watanabe | G02B 6/29352 | |
| 2020/0400885 A1* | 12/2020 | Nakajima | G02B 6/2821 | |
| 2021/0018814 A1* | 1/2021 | Gowda | H04J 14/08 | |
| 2021/0148735 A1* | 5/2021 | Jiang | G01D 5/35325 | |
| 2021/0159667 A1* | 5/2021 | Huang | G01B 9/02024 | |
| 2021/0201126 A1* | 7/2021 | Meng | G06N 3/0464 | |
| 2021/0239922 A1* | 8/2021 | Du | G02B 6/4269 | |
| 2021/0258663 A1* | 8/2021 | Yamaguchi | G02F 1/01 | |
| 2021/0325924 A1* | 10/2021 | Cable | H04B 10/70 | |
| 2022/0004075 A1* | 1/2022 | Cable | G02F 1/225 | |
| 2022/0021458 A1* | 1/2022 | Woodward | H04B 10/613 | |
| 2022/0045768 A1* | 2/2022 | Cingoz | H04L 7/0087 | |
| 2022/0221272 A1* | 7/2022 | Schmid | G01B 11/2441 | |
| 2022/0299308 A1* | 9/2022 | Shchegrov | G01B 11/272 | |
| 2022/0397392 A1* | 12/2022 | Courteville | G01B 9/0209 | |

FOREIGN PATENT DOCUMENTS

| | | | |
|---|---|---|---|
| EP | 3869758 | A1 | 8/2021 |
| JP | 2007274664 | B | 1/2010 |
| JP | 2008104141 | B | 4/2010 |
| JP | 2012027161 | A | 2/2012 |
| JP | 2019191344 | B | 8/2021 |
| WO | 2020078169 | A1 | 4/2020 |

OTHER PUBLICATIONS

Pereira et al., "Quantum key distribution with flawed and leaky source", npj Quantum Information, 2019, vol. 5:62.

* cited by examiner

PROVIDE DELAY INTERFEROMETERS — S1

SYNCHRONIZE DELAY TIME — S2

ADJUST PHASE DIFFERENCE — S3

DETERMINE CONTROL SIGNAL — S4

PROVIDE DELAY INTERFEROMETERS — S1

SYNCHRONIZE DELAY TIME — S2

ADJUST PHASE DIFFERENCE — S3

DETERMINE CONTROL SIGNAL — S4

ADJUST PHOTODETECTOR — S5

FIG. 6

CALIBRATION METHOD FOR PHASE MODULATOR, CALIBRATION METHOD FOR BALANCED PHOTODETECTOR, AND CALIBRATION SYSTEM FOR PHASE MODULATOR

TECHNICAL FIELD

The present invention relates to, in relation to quantum key distribution, a calibration method for phase modulator, a calibration method for balanced photodetector, and a calibration system for phase modulator.

BACKGROUND ART

Quantum key distribution is a technique that enables the sharing of information-theoretically secure cryptographic keys (random number sequences) with remote locations. Its security is theoretically guaranteed by the laws of physics. However, it is based on the assumption that the actual operation of the communication equipment does not deviate significantly from the theoretical operation.

In the field of quantum key distribution, research is underway to achieve higher speed and wider bandwidth with a method using the phase state of light. This method causes the phase state of light to map to the bit values of the information and performs phase modulation to the optical signal for transmission and reception. The phase modulation is a technique used for high-speed optical communication. The phase accuracy required for quantum key distribution significantly differs from the phase accuracy required for optical communication. For example, Non-Patent Literature 1 points out the importance of phase accuracy in the components that make up a quantum key distribution device.

PRIOR ART DOCUMENT

Non-Patent Literature

Non-Patent Literature: M. Pereira, M. Curtty, and K. Tamaki, "Quantum key distribution with flawed and leaky source", npj Quantum Information, volume 5, Article number: 62 (2019)

SUMMARY OF THE INVENTION

Problems to be Addressed by the Invention

In the case of optical communication, as digital processing is feasible, communication is possible without problems even if there is an error of 10-20 degrees in the phase of the optical signal. On the other hand, quantum key distribution requires the phase of an optical wave with less than one photon per pulse be established with a few degrees of accuracy. Simply controlling the phase based on the state measured by a photodetector does not ensure the absolute phase accuracy required for quantum key distribution. Therefore, in the field of quantum key distribution, there is a need for a technique that ensures the measured phase has absolute phase accuracy.

The present invention has been made to solve such problems and is aimed at providing a high-accurate method of calibrating a phase modulator, a high-accurate method of calibrating a balanced photodetector, and a high-accurate calibration system for calibrating the phase modulator, to ensure quantum state control with the accuracy required for quantum key distribution.

Solutions to Problem

To solve the problem, a phase modulator calibration method according to the invention is a phase modulator calibration method of calibrating a phase modulator whose phase modulation amount is controlled by a control signal, the method including steps of: providing a first delay interferometer to be used as a phase calibration reference and a second delay interferometer in which a phase modulator to be calibrated is installed in an optical path; for each of the first and second delay interferometers, measuring a delay time based on a time interval between pulses split from one input pulse and synchronizing the delay time with a cycle of a transmission clock; for the first delay interferometer, adjusting a phase difference so that input continuous-wave laser light produces an intensity-enhancing interference at an output; and determining the control signal with a calibration circuitry formed by connecting the first delay interferometer as a front stage and the second delay interferometer as a rear stage in a cascaded manner.

A phase modulator calibration system according to the present invention is a calibration system of a phase modulator whose phase modulation amount is controlled by a control signal, the calibration system including: a calibration circuitry; a light source configured to input light to the calibration circuitry; a photodetector connected to an output of the calibration circuitry; and a control signal generator configured to generate the control signal, wherein the calibration circuitry comprises: a first delay interferometer, which has been adjusted so that a delay time is synchronized with a cycle of a transmission clock and a phase difference produces an intensity-enhancing interference; and a second delay interferometer, in which a phase modulator to be calibrated is installed in an optical path, and wherein the first delay interferometer and the second delay interferometer are connected in cascade as a front stage and a rear stage, respectively.

Effects of the Invention

The present invention makes it possible to calibrate a phase modulator and a balanced photodetector with high accuracy to ensure the quantum state control with the accuracy required for quantum key distribution, and to provide a phase modulator calibration system capable of performing high-accurate calibration.

BRIEF DESCRIPTION OF DRAWINGS

FIG. 6 is a schematic diagram illustrating an example of a calibration circuitry according to an embodiment.

MODE FOR CARRYING OUT THE INVENTION

[Method of Calibrating Phase Modulator]

Figure 1:
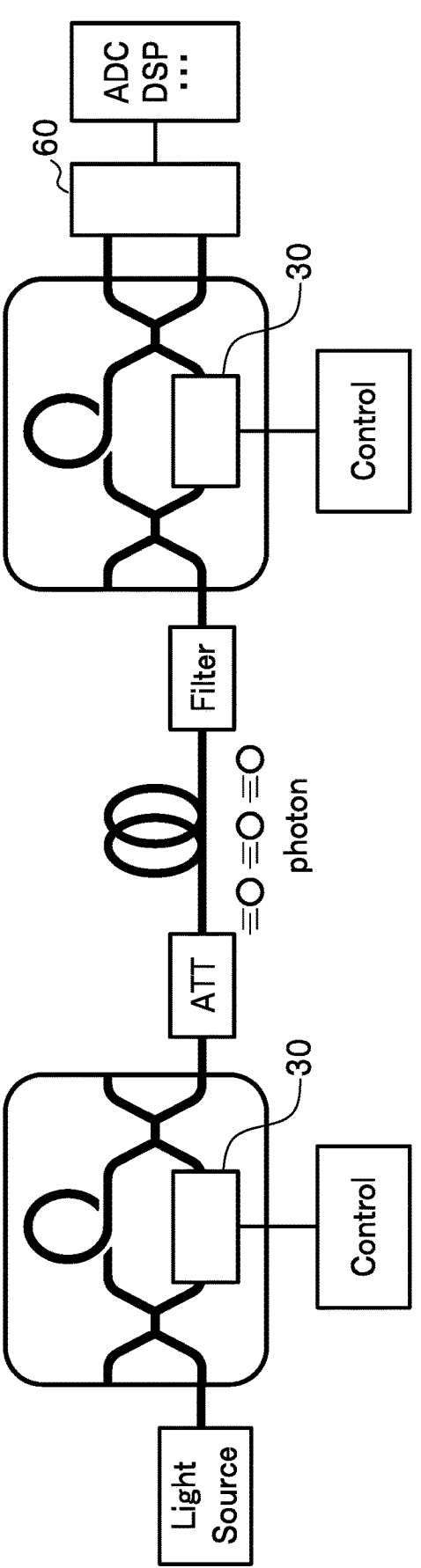
FIG. 1 is a schematic diagram illustrating an example of a quantum key distribution device.

A phase modulator calibration method according to the present invention will be described with reference to the drawings. The phase modulator to be calibrated according to the present invention is used in quantum key distribution devices, an example of which is illustrated in FIG. 1. The phase modulator is installed in both the delay interferometers on the transmission and reception sides.

The phase modulator is such that the phase modulation amount is to be controlled by a control signal. The phase modulator may be an LN phase modulator that performs phase modulation by an electrical signal utilizing the phenomenon that the refractive index of $LiNbO_3$ crystal varies according to an electric field.

Figures 2A, 2B:
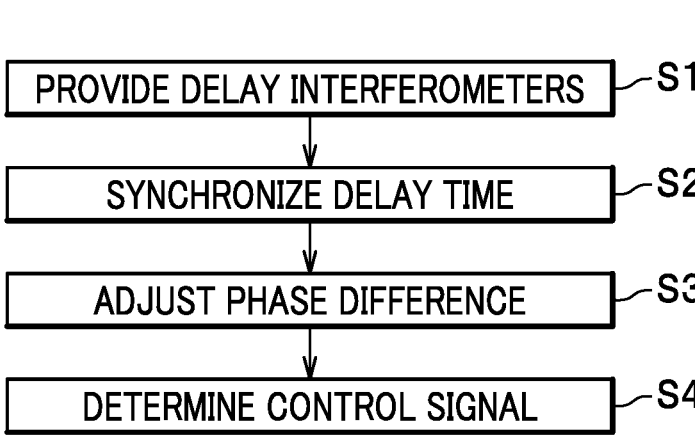
FIG. 2A is a flowchart illustrating an example of a phase modulator calibration method according to an embodiment.
FIG. 2B is a flowchart illustrating an example of a balanced photodetector calibration method according to an embodiment.

As illustrated in FIG. 2A, a phase modulator calibration method 1 according to the present invention includes: a delay interferometer providing step S1; a delay time synchronization step S2; a phase difference adjustment step S3; and a control signal determination step S4.

(Provision of Delay Interferometer)

The delay interferometer providing step S1 is a procedure to provide a first delay interferometer 10 and a second delay interferometer 20. A delay interferometer is a device that splits input light into two light rays at a one-to-one ratio and superimposes light having passed through a long optical path and light having passed through a short optical path to cause them to interfere with each other.

The delay interferometer is, for example, a Mach-Zehnder interferometer, and has means for adjusting the optical path lengths. It is preferable that the delay interferometer be such that even when the phase of the input light is changed with a short cycle, the variation in the phase difference between the light having passed through the long optical path and the light having passed through the short optical path is small. For this reason, an example of the implementation of a delay interferometer is to use, for example, an asymmetric interferometer using a planar lightwave circuit (hereinafter abbreviated as PLC) using quartz as the optical path and use temperature adjustment means for adjusting the optical path length.

Figure 3A:
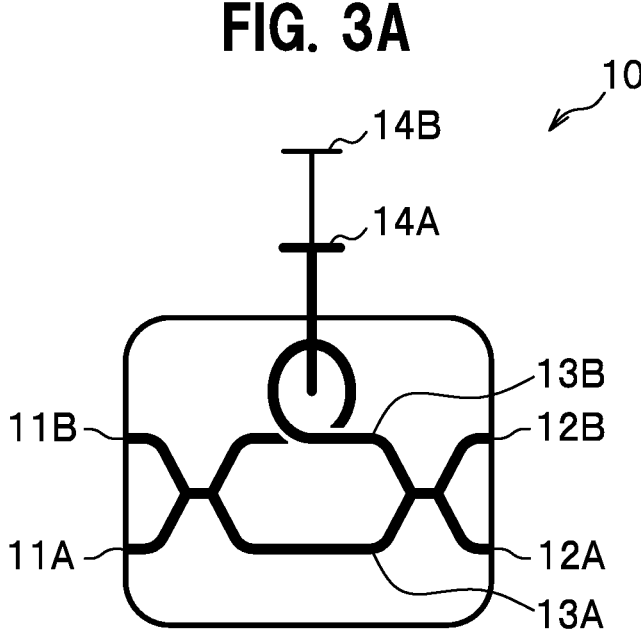
FIG. 3A is a schematic diagram of a first delay interferometer.

As the example illustrated in FIG. 3A, the first delay interferometer 10 has a short optical path 13A and a long optical path 13B, and has rough adjustment means 14A and fine adjustment means 14B as adjustment means for optical path length. The rough adjustment means 14A is a mechanical adjustment such as one using a screw or the like. The fine adjustment means 14B is an adjustment using a piezoelectric element or the like, or an adjustment using expansion and contraction due to changes in the temperature of the substance forming the optical path.

The first delay interferometer 10 has input terminals 11A and 11B and output terminals 12a and 12B. The phase modulator calibration method 1 uses one input terminal, e.g., 11A. Regarding the output terminal, one output terminal, e.g., 12A, is used. However, both the output terminals may be used. Regarding the output from the two output terminals 12A and 12B, when, for example, the phase difference between the light having passed through the short optical path 13A and the light having passed through the long optical path 13B is 0 degrees, the output is from the output terminal 12A; and when the phase difference is 180 degrees, the output is from the output terminal 12B.

The first delay interferometer 10 serves as a phase calibration reference in the phase modulator calibration method 1. Considering this, a delay interferometer that permits fine adjustments to the optical path lengths while ensuring stability in the adjusted optical path lengths is the preferred choice.

Figure 3B:
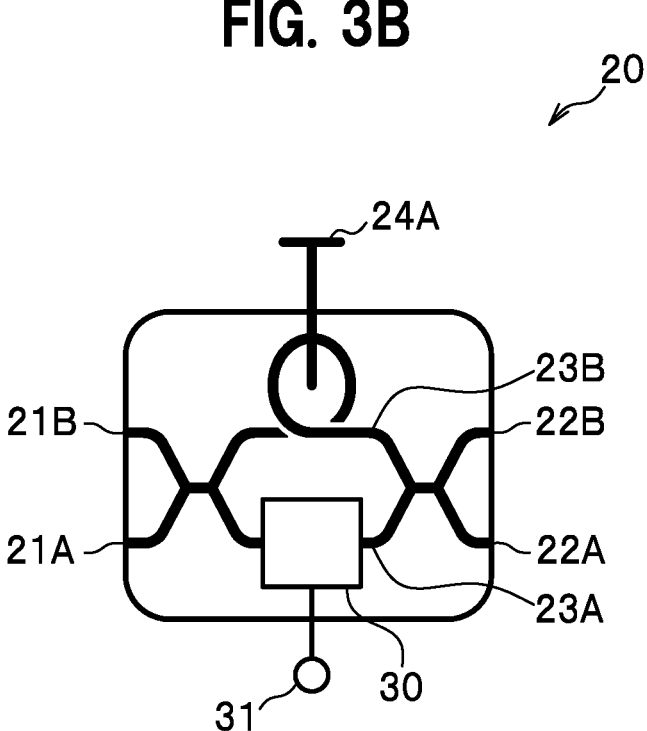
FIG. 3B is a schematic diagram of a second delay interferometer in which a phase modulator to be calibrated is installed.

As illustrated in FIG. 3B, the second delay interferometer 20 includes a short optical path 23A in which a phase modulator 30 to be calibrated is installed. The phase modulator 30 has a control signal input terminal 31 that allows control of the phase modulation amount form outside the second delay interferometer 20. The second delay interferometer 20 at least includes rough adjustment means 24A and may include fine adjustment means.

Note that in some cases illustration of the rough adjustment means, fine adjustment means, and control input terminal in the drawings may be omitted.

(Synchronization of Delay Time)

The delay time synchronization step S2 is a procedure to synchronize the delay times of the first and second delay interferometers 10 and 20 with the cycle of the transmission clock. In the case of the quantum key distribution according to the present invention, a phase state is set at every cycle of the transmission clock. Synchronizing the delay time of the delay interferometer with the cycle of the transmission clock enables the measurement of interference between light in adjacent time slots.

The delay time synchronization step S2 is performed by measuring the delay times of the delay interferometers and adjusting the optical path lengths. The delay time is measured by inputting pulse laser light to a delay interferometer and by measuring a time interval between pulses split from one input pulse. When measuring the delay time of the first delay interferometer 10, as the example illustrated in FIG. 4, a pulse laser PL is connected to one input terminal of the first delay interferometer 10, a photodetector PD is connected to one output terminal, and the waveform is measured by an oscilloscope OSC. When an input pulse P01 is split and outputted as two pulses P02 and P03, the step involves measuring the time interval $\Delta t$ between pulses P02 and P03 and adjusting the optical path length difference between the short optical path and the long optical path of the first delay interferometer 10 so that the time interval $\Delta t$ becomes identical to the cycle of the transmission clock.

In the delay time synchronization step S2, the adjustment of the optical path lengths may be performed by the rough adjustment means. For example, when the frequency of the transmission clock is 1 GHz and a delay interferometer whose delay time has been set to 1 ns in advance is available, the range of adjustment is expected to be 0.1 mm to 10 mm.

The same procedure is also applied to the second delay interferometer 20. Then, using the first and second interferometers 10 and 20 on which the delay time synchronization step S2 has been performed, the succeeding procedures are performed.

(Adjustment of Phase Difference)

The phase difference adjustment step S3 is a procedure for the first delay interferometer 10, which is used as the phase calibration reference, to adjust the phase difference so that the input light causes an intensity-enhancing interference on the output. In the phase difference adjustment step S3, the wavelength of the input light is the wavelength of signal light used in the optical communication path, e.g., an optical fiber, connecting the transmission side and the reception side. An example of such wavelength is 1.55 μm.

The phase difference meant in the phase difference adjustment step S3 means the phase difference between the light having passed through the short optical path and the light having passed through the long optical path and varies based on the difference between the optical path length of the short optical path and the optical path length of the long optical path. When the input light causes an intensity-enhancing interference at the output, the intensity of the light at the output is maximized. In view of this, the phase difference adjustment step S3 is performed by adjusting the optical path length so that the intensity of the light at the output of the delay interferometer is maximized.

Figure 5:
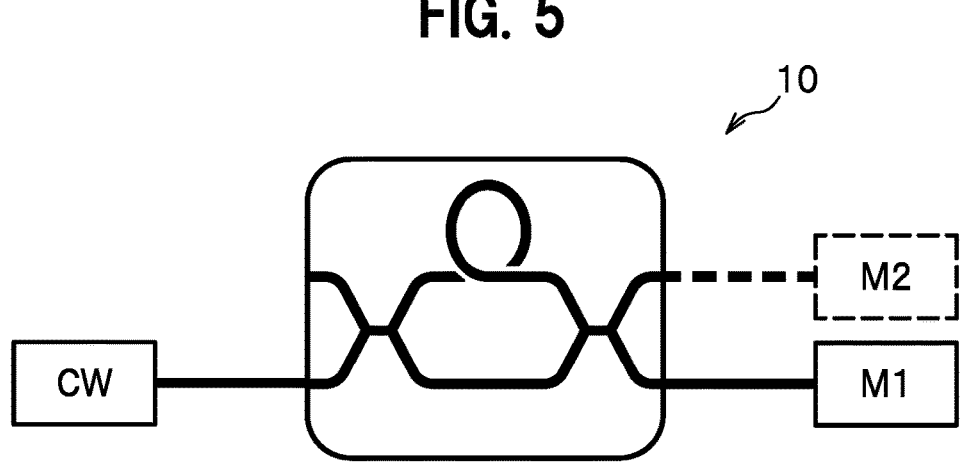
FIG. 5 is a schematic diagram illustrating an example of a circuitry with which the phase difference of a delay interferometer is measured.

The phase difference adjustment step S3 involves, as the example illustrated in FIG. 5, connecting a continuous-wave laser CW to one input terminal of the first delay interferometer 10 and a power meter M1 to one output terminal, and performing adjustment to obtain an optical path length showing a maximum value.

When the maximum and minimum output values of the power meter M1 are denoted as Vmax and Vmin respectively, the interference clarity expressed as (Vmax-Vmin)/(Vmax+Vmin) serves as an indicator of the presence of sufficient interference.

Interference clarity enables measures, for example, to check the calibration system if a certain level of interference clarity is not ensured.

It is possible to further measure the extinction ratio, in the vicinity of the maximum value Vmax. Performing the adjustment to maximize the extinction ratio allows for a more precise adjustment of the optical path length. The extinction ratio is given by 10·log (Vmax/Vmin).

The phase difference adjustment step S3 performs adjustment of optical path length by the fine adjustment means. For example, when the wavelength of the signal light is 1.55 μm and when the refractive index of the optical path of the delay interferometer is 1.5, the optical path length corresponding to 360-degree phase difference is approximately 1 μm. Therefore, to control the phase with an accuracy of less than 4 degrees, an adjustment of about 10 nm is required. This adjustment can be achieved, for instance, through the use of a piezoelectric element or temperature control. The adjustment through the use of temperature control is preferred because it enables particularly fine adjustment.

The subsequent procedures are conducted using the first delay interferometer 10 to which the phase difference adjustment step S3 has been applied as the reference for phase calibration.

(Determination of Control Signal)

The control signal determination step S4 is a procedure to determine the value of the control signal corresponding to a phase modulation amount for the phase modulator to be calibrated. To be more precise, the correspondence relationship between the phase modulation amount and the control signal varies among individual phase modulators. Determining the control signal value corresponding to the phase modulation amount for each phase modulator enables calibration of the phase modulator. It is possible to observe the phase modulation amount by causing an interference of light.

Figure 6:
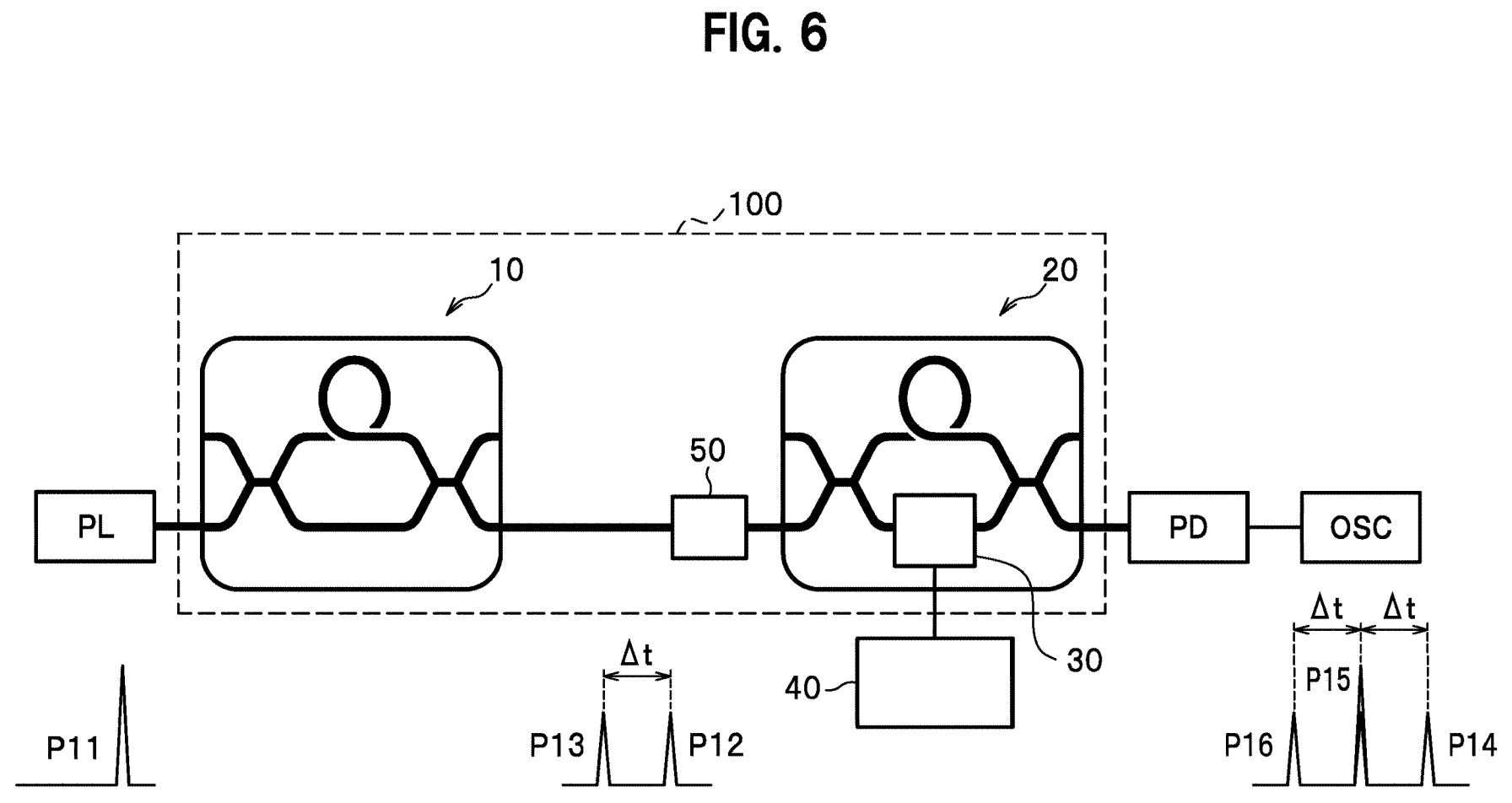

The control signal determination step S4 is performed using a calibration circuitry 100, which is, as illustrated in FIG. 6, formed by connecting in a cascaded manner the first delay interferometer 10, having undergone the phase difference adjustment step S3, as the front stage to the second delay interferometer 20, having undergone the delay time synchronization step S2, as the rear stage. The phase modulator 30 is installed in the short optical path of the second delay interferometer 20. In the calibration circuitry 100, the second delay interferometer 20 is preferably a PLC or the like and, when polarization dependency is a matter of concern, it is preferable that the calibration circuitry 100 have a polarization filter 50 in front of the input terminal of the second delay interferometer 20.

The control signal determination step S4 involves connecting the pulse laser PL to the input terminal of the front stage 10 of the calibration circuitry 100 and connecting the photodetector PD to the output terminal of the rear stage 20 to measure the waveform by the oscilloscope OSC. A control signal generator 40 is connected to the phase modulator 30. The control signal generator 40 is a device that generates a voltage signal for controlling the phase modulator 30.

As the example illustrated in FIG. 6, the pulse P11 inputted is split into two pulses P12 and P13 by the front stage 10 and then the two pulses P12 and P13 are each split into two pulses by the rear stage 20. As the delay time of the front stage 10 and the delay time of the rear stage 20 are each Δt, three pulses P14, P15, and P16 with time intervals Δt are outputted from the rear stage 20. The central pulse P15 is positioned at the midpoint between the leading pulse P14 and the trailing pulse P16. The intensity of the central pulse P15 corresponds to the phase modulation amount of the phase modulator 30.

Quantum key distribution requires control signal values that produce a phase modulation amount of 0 degrees and a phase modulation amount of 180 degrees. Accordingly, the central pulse P15 is measured while adjusting the control signal by the control signal generator 40. The intensity of the central pulse P15 is maximized by an intensity-enhancing interference when the phase modulation amount is 0 degrees and is minimized by an intensity-diminishing interference when the phase modulation amount is 180 degrees. In view of this, a control signal that produces a maximum intensity of the central pulse P15 is determined as 0-degree control signal and a control signal that produces a minimum intensity of the central pulse P15 is determined as 180-degree control signal.

Through the control signal determination step S4, values of the control signals corresponding to the 0- and 180-degree phase modulation amounts are determined, completing the calibration of the phase modulator.

[Method of Calibrating Balanced Photodetector]

Next, description will be given of a balanced photodetector calibration method according to the present invention. The balanced photodetector to be calibrated according to the present invention has a pair of input terminals. A balanced photodetector 60 is, for example, as illustrated in FIG. 1, a device connected to a delay interferometer of a quantum key distribution device on the reception side and configured to convert the difference between light intensities at the two input terminals into an electrical signal to be outputted. The electrical signal outputted is inputted to an AD converter of a signal processing device.

The balanced photodetector calibration method 2 according to the present invention includes, as illustrated in FIG. 2B, a delay interferometer providing step S1, a delay time synchronization step S2, a phase difference adjustment step S3, a control signal determination step S4, and a photodetector adjustment step S5. As the steps from the delay interferometer providing step S1 to the control signal determination step S4 are common to those in the phase modulator calibration method 1 already described, the description thereof is omitted.

(Adjustment of Photodetector)

The photodetector adjustment step S5 is a procedure to adjust the balanced photodetector so that it operates without a bias. The balanced photodetector is capable of outputting a difference between the intensities of a pair of input light rays as an electrical signal. Accordingly, the photodetector is to be adjusted so that the magnitude of the electrical signal generated for light rays having the same intensity does not fluctuate between the input terminals. The photodetector adjustment step S5 is conducted based on the optical signals to which phase modulation has been applied by the calibrated phase modulator 30.

Figure 7:
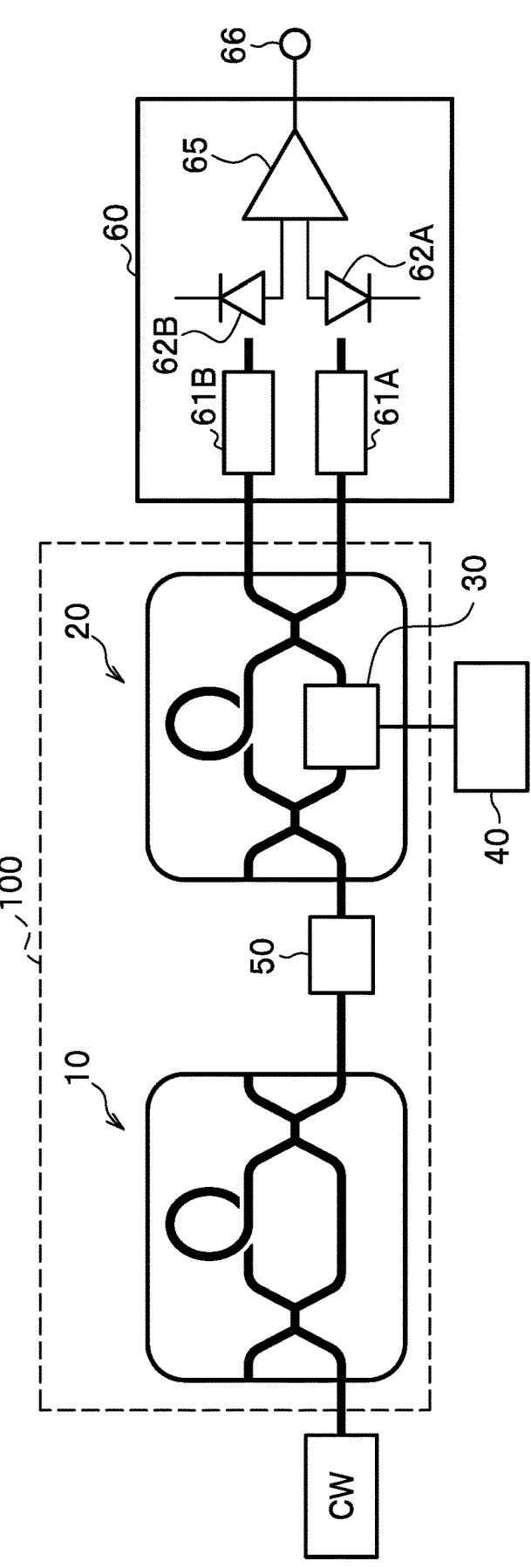
FIG. 7 is a schematic diagram illustrating an example of a calibration circuitry of a balanced photodetector.

The balanced photodetector 60 has, for example, as illustrated in FIG. 7: a pair of photodiodes 62A and 62B; optical attenuators 61A and 61B; and an amplifier 65. The pair of input light rays is incident upon the pair of photodiodes 62A and 62B via the optical attenuators 61A and 61B. The optical currents of the pair of photodiodes 62A and 62B are input to the amplifier 65 that converts currents to a voltage, resulting in an output of a voltage corresponding to the difference between the optical currents from the output terminal 66.

The photodetector adjustment step S5 is conducted with the continuous-wave laser CW connected to the input terminal of the front stage 10 of the calibration circuitry 100 and the balanced photodetector 60 connected to the output terminals of the rear stage 20 of the calibration circuitry 100. The wavelength of the input continuous-wave laser light is the same as the wavelength of the continuous-wave laser light used in the phase difference adjustment step S3. The output of the balanced photodetector 60 may be measured, for example, as a voltage waveform with an oscilloscope. The control signal generator 40 is connected to the phase modulator 30.

The control signal generator 40 is set to alternately repeat the 0-degree control signal and 180-degree control signal determined with the phase modulator calibration method 1. The repeat frequency is the frequency of the transmission clock, for example. When the 0-degree control signal is fed, the two outputs of the rear stage 20 are such that one is intensity-enhanced and the other is intensity-diminished. Conversely, when the 180-degree control signal is fed, the two outputs are such that the one is intensity-diminished and the other is intensity-enhanced. Thus, the two outputs of the rear stage 20 produce opposite-phase light rays that vary in the same intensity range.

The adjustment is conducted so that the balanced photodetector 60 operates for these output light rays without a bias. When the balanced photodetector 60 operates without a bias, the amplitude of the output voltage is maximized. In view of this, the gains of the balanced photodetector 60 for the pair of input terminals are each adjusted so that the amplitude of the output voltage is maximized. It is preferable to further measure the extinction ratio and adjust the gains of the balanced photodetector 60 so that the extinction ratio at the rear stage 20 is maximized. The adjustment of the gains may be performed based on the attenuation amount of the optical attenuators 61A and 61B or with internal resistive elements or the like of the amplifier 65.

The phase modulator 30 and/or the balanced photodetector 60 are used in a quantum key distribution device and may deviate from its calibrated state. Therefore, it is preferable to determine an interval of days or the like for example and periodically perform calibration using the phase modulator calibration method 1 and the balanced photodetector calibration method 2.

[Phase Modulator Calibration System]

Next, description will be given of a phase modulator calibration system according to the present invention. A phase modulator calibration system 3 calibrates a phase modulator whose phase modulation amount is controlled by a control signal. The phase modulator is an LN phase modulator, for example.

Figure 8:
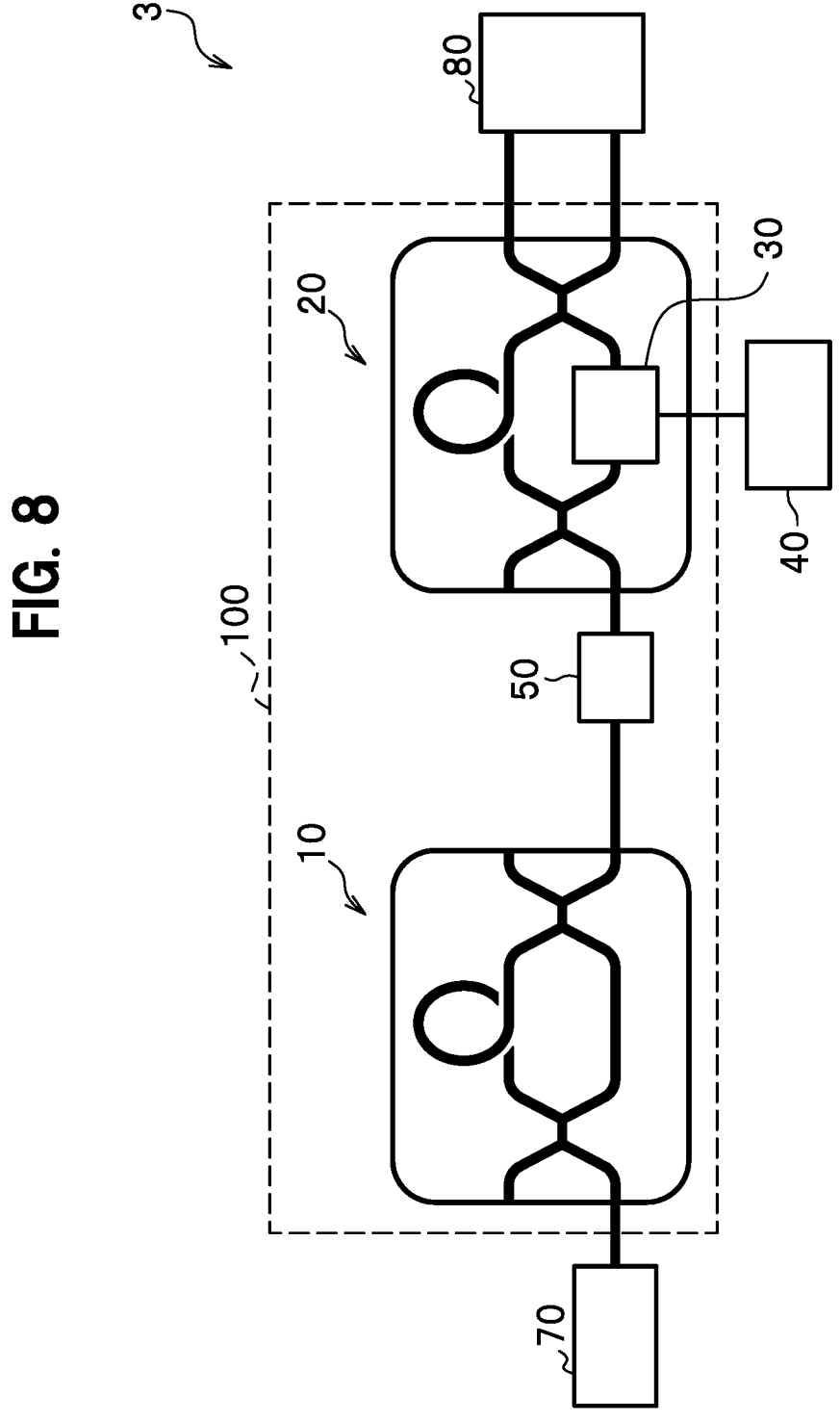
FIG. 8 is a schematic diagram illustrating an example of a phase modulator calibration system according to an embodiment.

The phase modulator calibration system 3 includes, as illustrated in FIG. 8, a calibration circuitry 100, a light source 70, a photodetector 80, and a control signal generator 40. The calibration circuitry 100 includes the first delay interferometer 10 and the second delay interferometer 20, which are connected in cascade as the front stage and the rear stage, respectively. The first delay interferometer 10 has been adjusted so that the delay time is synchronized with the cycle of the transmission clock and the phase difference produces an intensity-enhancing interference. In the second delay interferometer 20, the delay time is synchronized with the cycle of the transmission clock and the phase modulator 30 to be calibrated is installed in an optical path. It is preferable that the calibration circuitry 100 have a polarization filter 50 in front of the rear stage 20 when polarization dependency of the rear stage 20 is a matter of concern.

The first and second delay interferometers 10 and 20, the phase modulator 30, and the control signal generator 40 are as described already. The light source 70 is, for example, a pulse laser or a continuous-wave laser. The photodetector 80 outputs a current or voltage corresponding to the intensity of light and may be connected to both or one of the two outputs of the rear stage 20.

The phase modulator calibration method 1 according to the present invention is a method of calibrating a phase modulator whose phase modulation amount is controlled by a control signal, the method including steps of: providing (S1) a first delay interferometer 10 to be used as a phase calibration reference and a second delay interferometer 20 in which a phase modulator 30 to be calibrated is installed in an optical path; for each of the first and second delay interferometers 10 and 20, measuring a delay time based on a time interval between pulses split from one input pulse and synchronizing (S2) the delay time with the cycle of the transmission clock; for the first delay interferometer 10, adjusting (S3) the phase difference so that the input continuous-wave laser light produces an intensity-enhancing interference at the output; and determining (S4) the control signal with a calibration circuitry 100 formed by connecting the first delay interferometer 10 as a front stage and the second delay interferometer 20 as a rear stage in a cascaded manner.

With such configuration, the phase modulator calibration method 1 uses the first delay interferometer 10, which has been adjusted so that the phase difference caused by the optical path difference is 0 degree (including integer multiples of 360 degrees), as the calibration reference. This makes it possible to ensure that the phase modulation amount by the calibrated phase modulator 30 is a correct value as an absolute phase. In addition, the adjustment of the phase difference of the first delay interferometer 10 is performed using continuous light. This allows the first delay interferometer 10, which is used as the phase calibration reference, to be accurately adjusted in an easy manner.

The phase modulator calibration method 1 allows the calibration to be performed using before-attenuation, strong optical pulses or continuous light, rather than using weak light originally required for quantum key distribution. Accordingly, accuracy of the calibration is increased, and the calibration is performed with respect to the absolute phase with high accuracy even when the frequency of the transmission clock is high. As a result, provision of the accurately calibrated phase modulator to both the transmission and reception sides of quantum key distribution increases the implementation security of the quantum key distribution devices.

The adjustment step S3 for adjusting the phase difference of the first delay interferometer 10 is preferably conducted by adjusting the temperature of the first delay interferometer 10.

With such configuration, the phase modulator calibration method 1 accurately performs the adjustment of the phase difference of the first delay interferometer 10.

The adjustment step S3 for adjusting the phase difference of the first delay interferometer 10 is preferably conducted by measuring the extinction ratio at the output and performing the adjustment so that the extinction ratio is maximized.

With such configuration, the phase modulator calibration method 1 further accurately performs the adjustment of the phase difference of the first delay interferometer 10.

It is preferable for the control signal determination step S4 to include: while inputting pulse laser light into an input of the front stage 10 and measuring the intensity of a central pulse positioned at the midpoint between a leading pulse and a trailing pulse split from one pulse and outputted from the rear stage 20, adjusting a control signal to determine a control signal that produces a maximum intensity of the central pulse as a 0-degree control signal and to determine a control signal that produces a minimum intensity of the central pulse as a 180-degree control signal.

With such configuration, the phase modulator calibration method 1 performs accurate calibration in a clarified, easy-to-understand manner.

The balanced photodetector calibration method 2 according to the present invention includes: in the calibration circuitry 100 in which the phase modulator 30 has been calibrated according to the phase modulator calibration method 1, inputting continuous-wave laser light into an input of the front stage 10 and alternately repeating the 0-degree control signal and the 180-degree control signal to control the phase modulator 30; and adjusting a gain of the balanced photodetector 60 connected to the rear stage 20 so that the extinction ratio measured by the balanced photodetector 60 is maximized.

With such configuration, the balanced photodetector calibration method 2 calibrates the balanced photodetector 60 as well with high accuracy using the calibrated first delay interferometer 10 and the calibrated phase modulator 30 as a calibration reference. With this, the implementation security of quantum key distribution is further increased.

Using the phase modulator and balanced photodetector calibrated by the phase modulator calibration method 1 and balanced photodetector calibration method 2 ensures the implementation security of quantum key distribution and makes it possible to determine whether the quantum key distribution device is correctly implemented.

The phase modulator calibration system according to the present invention is a calibration system of a phase modulator whose phase modulation amount is controlled by a control signal, the calibration system including: a calibration circuitry 100; a light source 70 configured to input light to the calibration circuitry 100; a photodetector 80 connected to an output of the calibration circuitry 100; and a control signal generator 40 configured to generate a control signal.

The calibration circuitry 100 includes: a first delay interferometer 10, which has been adjusted so that a delay time has been synchronized with a cycle of the transmission clock and a phase difference has been adjusted to produce an intensity-enhancing interference; and a second delay interferometer 20, in which a phase modulator 30 to be calibrated is installed in an optical path. The first delay interferometer 10 and the second delay interferometer 20 are connected in cascade as a front stage and a rear stage, respectively.

With such configuration, the phase modulator calibration system 3 calibrates the phase modulator 30 with high accuracy using the first delay interferometer 10 as a phase calibration reference. Moreover, the phase modulator calibration system 3 enables verification of the operation of the phase modulator. With this, it is possible to determine whether the quantum key distribution device is correctly implemented.

Note that the delay interferometer may be, in addition to PLC, one in which the optical path is a space or optical fiber and the optical system is constructed using half mirrors or the like.

In the second delay interferometer 20, the phase modulator 30 may be installed in the long optical path 23B rather than the short optical path 23A. In addition, the installation of the phase modulator 30 in the second delay interferometer 20 may be performed after performing the delay time synchronization step S2.

Figure 4:
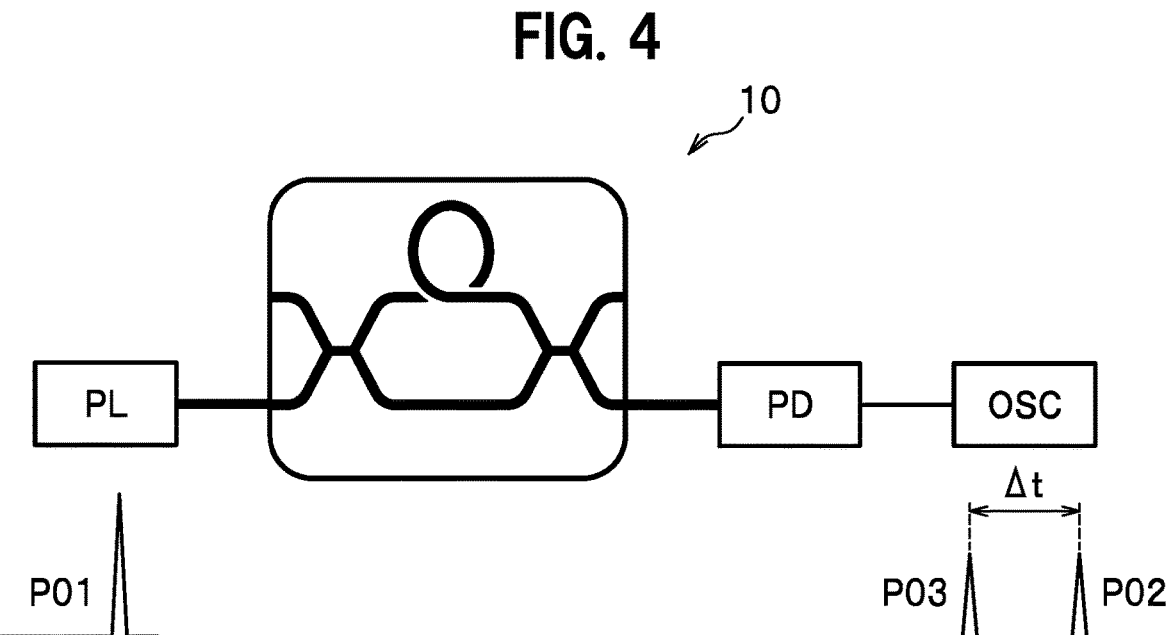
FIG. 4 is a schematic diagram illustrating an example of a circuitry with which the delay time of a delay interferometer is measured.

The adjustment step S3 of adjusting phase difference of the first delay interferometer 10 may be performed by inserting a dielectric near the optical path and varying the voltage applied to the dielectric. In addition, power meters M1 and M2 may be connected to the two output terminals to measure the intensities of the light. Alternatively, rather than the power meters, the photodetector PD and the oscilloscope OSC may be connected for measurement as illustrated in FIG. 4.

When a continuous-wave laser which emits light with the wavelength of light with which the phase difference of the first delay interferometer 10 has been calibrated is used as the light source 70 and a balanced photodetector 60 to be calibrated is used as the photodetector 80, the phase modulator calibration system 3 functions as a balanced photodetector calibration system to calibrate the balanced photodetector 60 with high accuracy.

REFERENCE SIGNS LIST

1: Calibration method (phase modulator)
2: Calibration method (balanced photodetector)
3: Calibration system (phase modulator)
10: First delay interferometer
20: Second delay interferometer
30: Phase modulator
31: Control signal input terminal
40: Control signal generator
50: Polarization filter
60: Balanced photodetector
70: Light source
80: Photodetector
100: Calibration circuitry

What is claimed is:

1. A phase modulator calibration method of calibrating a phase modulator whose phase modulation amount is controlled by a control signal, the method comprising steps of:

providing a first delay interferometer to be used as a phase calibration reference and a second delay interferometer in which a phase modulator to be calibrated is installed in an optical path;

for each of the first and second delay interferometers, measuring a delay time based on a time interval between pulses split from one input pulse and synchronizing the delay time with a cycle of a transmission clock;

for the first delay interferometer, adjusting a phase difference so that input continuous-wave laser light produces an intensity-enhancing interference at an output; and determining the control signal with a calibration circuitry formed by connecting the first delay interferometer as a front stage and the second delay interferometer as a rear stage in a cascaded manner.

2. The phase modulator calibration method according to claim 1, wherein the step of adjusting the phase difference of the first delay interferometer is performed by adjusting a temperature of the first delay interferometer.

3. The phase modulator calibration method according to claim 1, wherein the step of adjusting the phase difference of the first delay interferometer is performed by measuring an extinction ratio at the output and performing an adjustment so that the extinction ratio is maximized.

4. The phase modulator calibration method according to claim 1, wherein the step of determining the control signal comprises:

while inputting pulse laser light into an input of the front stage and measuring an intensity of a central pulse positioned at a midpoint between a leading pulse and a trailing pulse split from one pulse and outputted from the rear stage, adjusting the control signal to determine a control signal that produces a maximum intensity of the central pulse as a 0-degree control signal and to determine a control signal that produces a minimum intensity of the central pulse as a 180-degree control signal.

5. A balanced photodetector calibration method comprising steps of, in the calibration circuitry in which the phase modulator has been calibrated by the phase modulator calibration method according to claim 4:

inputting the continuous-wave laser light to the input of the front stage and alternately repeating the 0-degree control signal and the 180-degree control signal to control the phase modulator; and adjusting a gain of a balanced photodetector connected to an output of the rear stage so that an extinction ratio measured with the balanced photodetector is maximized.

6. A calibration system of a phase modulator whose phase modulation amount is controlled by a control signal, the calibration system comprising:

a calibration circuitry including: a first delay interferometer to be used as a phase calibration reference; and a second delay interferometer in which a phase modulator to be calibrated is installed in an optical path, a light source configured to input light to the calibration circuitry;

a photodetector connected to an output of the calibration circuitry; and a control signal generator configured to generate the control signal, wherein the first delay interferometer and the second delay interferometer are connected in cascade as a front stage and a rear stage, respectively, a delay time is measured for each of the first delay interferometer and the second delay interferometer, based on a time interval between pulses split from one input pulse, and the delay time is synchronized with a cycle of a transmission clock, a phase difference is adjusted for the first delay interferometer so that input continuous-wave laser light produces an intensity-enhancing interference at an output, and the control signal is determined with the calibration circuitry.

\* \* \* \* \*